(12) United States Patent
Rawlings (10) Patent No.: US 8,173,936 B2
(45) Date of Patent: *May 8, 2012

(54) VEHICULAR MIRROR WITH HEATER CIRCUIT MODULE

(75) Inventor: Don S. Rawlings, Caledonia, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,955

(22) Filed: Dec. 28, 2010

(65) Prior Publication Data

US 2011/0120983 A1 May 26, 2011

Related U.S. Application Data

(63) Continuation of application No. 11/779,047, filed on Jul. 17, 2007, now Pat. No. 7,858,905, which is a continuation of application No. 10/711,349, filed on Sep. 13, 2004, now Pat. No. 7,244,912.

(60) Provisional application No. 60/481,360, filed on Sep. 11, 2003.

(51) Int. Cl.
*G02F 1/155* (2006.01)
*H05B 3/03* (2006.01)
*H05B 3/16* (2006.01)
*H05B 3/20* (2006.01)
*H05B 3/28* (2006.01)

(52) U.S. Cl. ......... 219/219; 219/202; 219/541; 359/265

(58) Field of Classification Search .................. None
See application file for complete search history.

(56) References Cited

U.S. PATENT DOCUMENTS

| 5,808,777 | A | 9/1998 | Lynam et al. |
| 6,166,848 | A | 12/2000 | Cammenga et al. |
| 6,244,716 | B1 * | 6/2001 | Steenwyk et al. ............ 359/603 |
| 6,247,823 | B1 | 6/2001 | Fuerst et al. |
| 6,312,135 | B1 | 11/2001 | Polzer |
| 6,426,485 | B1 | 7/2002 | Bulgajewski et al. |
| 6,650,457 | B2 | 11/2003 | Busscher et al. |
| 6,669,267 | B1 | 12/2003 | Lynam et al. |
| 6,969,101 | B2 | 11/2005 | Lynam et al. |
| 7,195,381 | B2 | 3/2007 | Lynam et al. |
| 7,244,912 | B1 | 7/2007 | Rawlings |
| 7,408,694 | B2 | 8/2008 | Busscher et al. |
| 7,706,046 | B2 * | 4/2010 | Bauer et al. ................... 359/267 |
| 2002/0171954 | A1 | 11/2002 | Bonardi et al. |

FOREIGN PATENT DOCUMENTS

GB    2 250 406 A    6/1992

* cited by examiner

*Primary Examiner* — Joseph M Pelham
(74) *Attorney, Agent, or Firm* — McGarry Bair PC (57) ABSTRACT

A reflective element assembly is associated with at least two functional elements, each functional element including at least one functional element electrical contact. The reflective element assembly has a reflective element and reflective element carrier. A power distributor is disposed between the reflective element and the carrier, and includes an integrated heater and power distribution element, a support member having a reverse face and an obverse face, an array of electrically-conductive tracings, and a plurality of discrete electrical contacts points for electrical coupling of the array with the at least two functional elements. At least one of the plurality of discrete electrical contacts points is adapted for electrical communication with at least one functional element electrical contact point of a first functional element, and at least one functional element electrical contact point of a second functional element. The power distributor has a singular module connection.

26 Claims, 6 Drawing Sheets

VEHICULAR MIRROR WITH HEATER CIRCUIT MODULE

CROSS-REFERENCE TO RELATED APPLICATIONS

This application is a continuation of U.S. application Ser. No. 11/779,047, filed Jul. 17, 2007, now U.S. Pat. No. 7,858,905, issued Dec. 28, 2010, which is a continuation of U.S. application Ser. No. 10/711,349, filed Sep. 13, 2004, now U.S. Pat. No. 7,244,912, issued Jul. 17, 2007, which claims the benefit of U.S. provisional application Ser. No. 60/481,360, filed Sep. 11, 2003, each of which is incorporated herein by reference in their entirety.

BACKGROUND OF THE INVENTION

1. Field of the Invention

The invention relates to a vehicular rearview mirror system. In one aspect, the invention relates to a modular heating and power supply panel for providing power to a rearview mirror system incorporating several powered functions.

2. Description of the Related Art

Externally-mounted rearview mirror assemblies are ubiquitous for contemporary motor vehicles. Such mirror assemblies have long been used to aid the driver in operating the vehicle, especially in improving the driver's rearward view. Contemporary rearview mirror assemblies increasingly incorporate enhanced functionality in addition to image reflection, such as turn signal indicators, automatic dimming capabilities, and heating/defogging elements.

The functional elements, e.g. turn signals and heating/defogging elements, incorporated into the mirror assembly are typically powered and controlled by the vehicle's power supply and control systems. This necessitates separate power and control feeds to each functional element, which typically comprise separate wire harnesses. As well, each functional element typically comprises a distinct structural component which must be assembled into the finished mirror assembly. Assembly of the various functional elements and their associated power and control feeds can thus be complicated, particularly as the number and complexity of the functional elements increases. It is frequently necessary to simultaneously assemble several components into the mirror assembly, while ensuring that the components are in the proper positional relationship, and their power and control feeds are properly interconnected. Improper assembly of the components can result in a mirror assembly that does not perform properly. Difficulty with achieving proper assembly, and the frequency of defective assemblies, contribute to an increase in the cost of such mirror assemblies.

SUMMARY OF THE INVENTION

A reflective element assembly for a vehicle exterior rearview mirror system comprises a reflective element having a reverse face and an obverse face, and a reflective element carrier. A power distributor disposed between the reflective element and reflective element carrier includes an integrated heater/power supply, a support member having a reverse face and an obverse face, an array of electrically-conductive tracings, and a plurality of discrete contact points for electrical coupling of the array with at least two functional elements. At least one of the plurality of discrete contact points is adapted for electrical communication with at least one functional contact point of a first functional element. At least one of the plurality of discrete contact points is adapted for electrical communication with at least one functional contact point of a second functional element. The power distributor comprises a singular module connection.

DESCRIPTION OF EMBODIMENTS OF THE INVENTION

Figure 1:
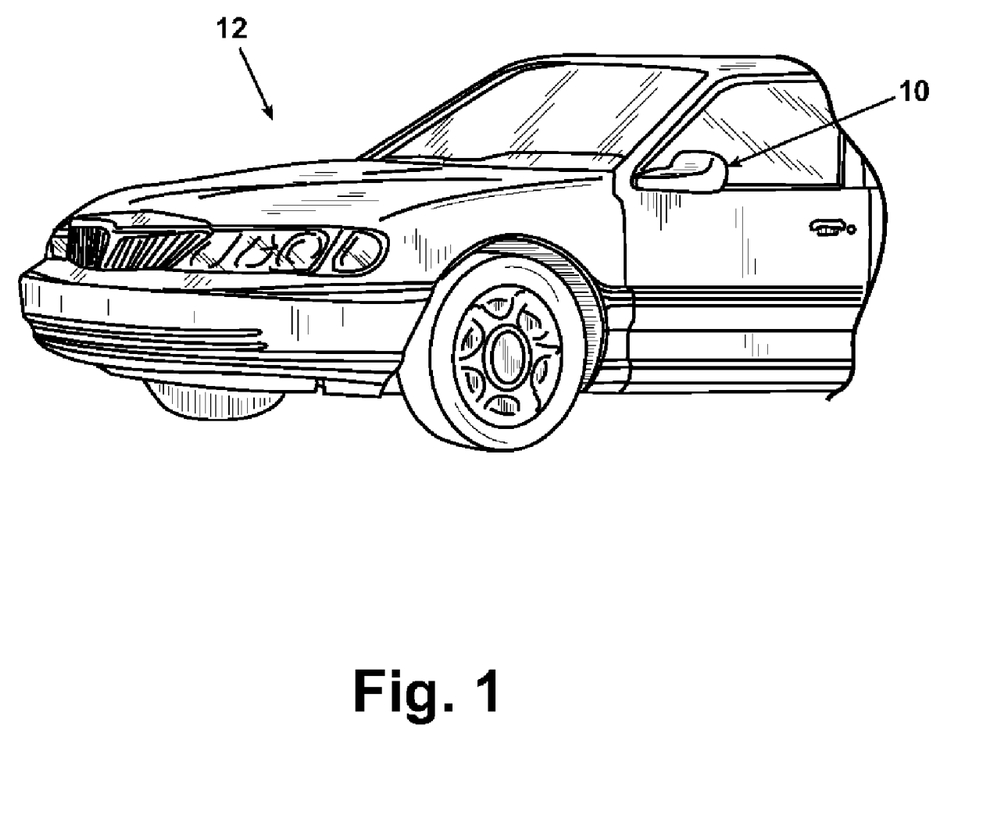
FIG. 1 is a partial perspective view of a vehicle having a rearview mirror system comprising a modular heater circuit according to the invention.
Figure 2:
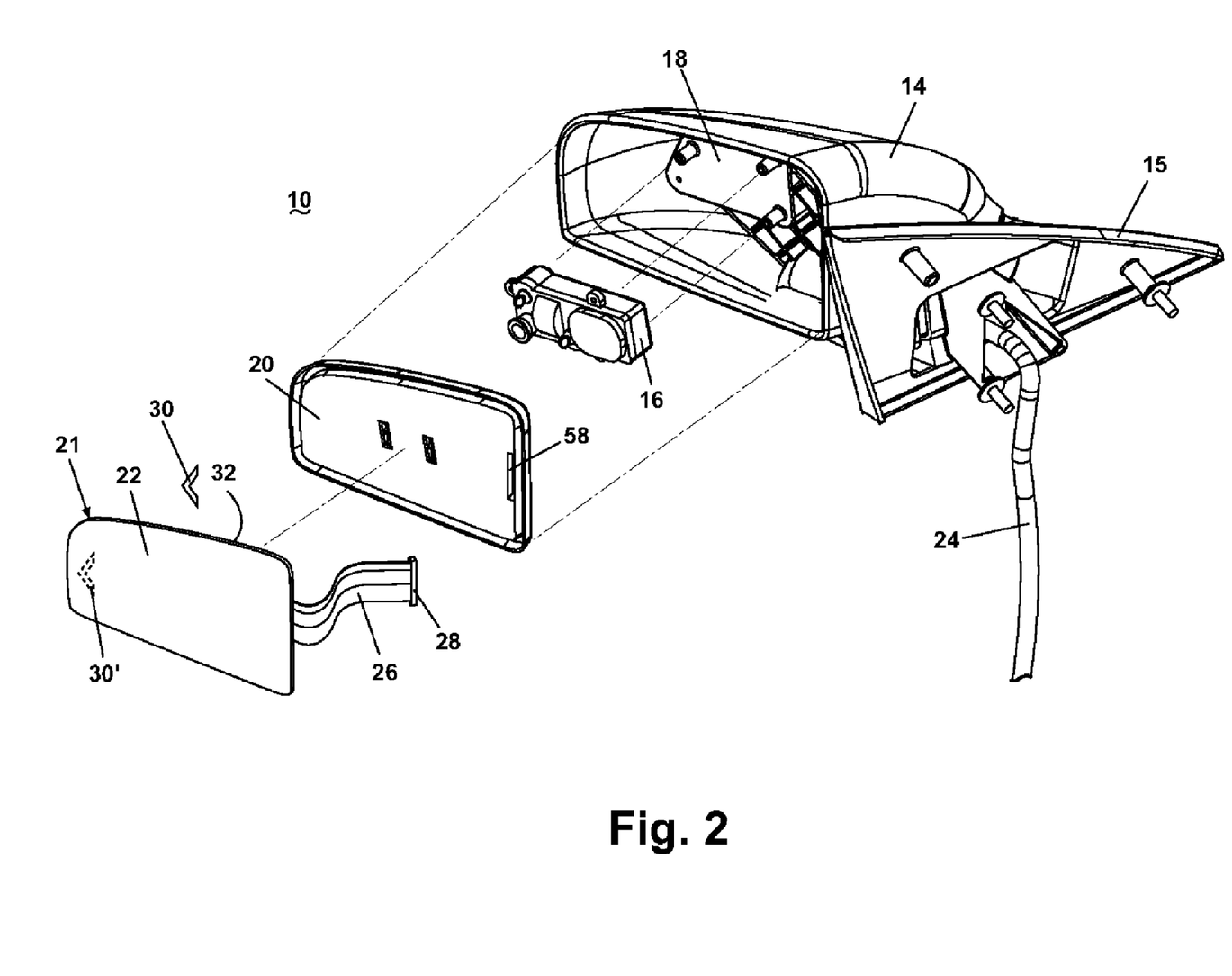
FIG. 2 is an exploded view of the rearview mirror system shown in FIG. 1 comprising a reflective element assembly and a mirror case.

Referring now to FIGS. 1 and 2, an external rearview mirror system 10 according to the invention is shown attached to a motor vehicle 12. In most respects, the external rearview mirror system 10 is similar to a conventional rearview mirror assembly, and comprises a shell 14 attached to a base 15 through which the rearview mirror system 10 is attached to the motor vehicle 12. The shell 14 encloses a tilt actuator assembly 16 mounted to a support frame 18, which is used to adjust the orientation of a reflective element carrier 20 about two perpendicular axes. The reflective element carrier 20 mounts a reflective element assembly 21. A wire harness 24 provides power and operational control from the vehicle power/control center to the rearview mirror system 10.

Figure 3:
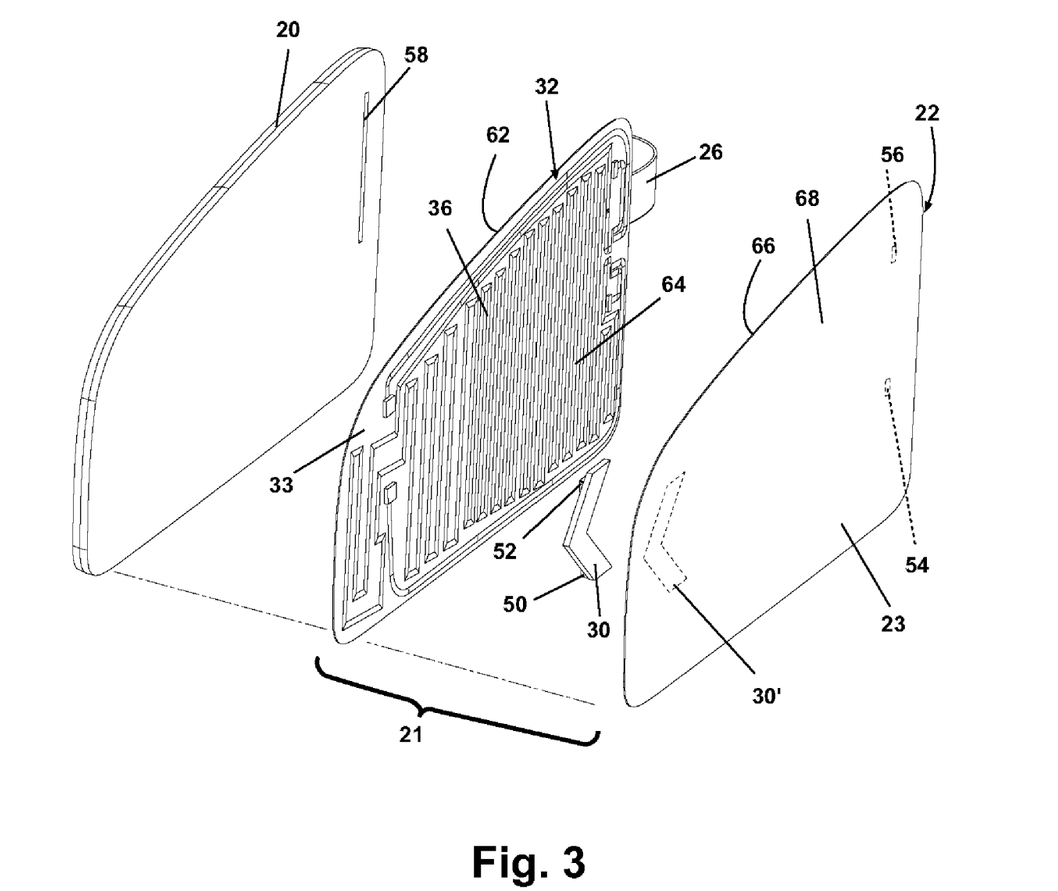
FIG. 3 is an exploded view of the reflective element assembly and mirror case shown in FIG. 2 comprising an integrated heater pad/power supply array.

Referring also to FIG. 3, the reflective element assembly 21 comprises a reflective element 22, and a power distributor 32 according to the invention, which is illustrated in exemplary form as an integrated heater pad and power supply array. The reflective element 22 comprises a plate-like support member 23 having a reverse face 66 and an obverse face 68. The reflective element 22 can comprise a generally conventional mirror comprising, for example, a coated glass or reflective polymer attached to the reverse face 66. The reverse face 66 of the reflective element 22 can also be positioned adjacent to a turn signal element 30 for turn signal indication, as hereinafter described.

As shown in the drawings the reflective element 22 can be provided with an optical region 30' through which light emitted from the turn signal element 30 can be displayed, typically to drivers located rearwardly of the vehicle on which the mirror system described herein is mounted. The optical region 30' can be any known light-transmitting region such as a transparent area, a translucent area, whether covered by a filter, optical mask and the like. It will also be understood that the optical region 30' can simply be an area on the reflective element 22 through which light from the turn signal element 30' emanates.

The turn signal element 30 is also provided with a turn signal power contact point 50 and a turn signal common contact point 52. The contact points 50, 52 are adapted for electrical connection with a positive terminal and a negative terminal of a power supply for activation of the turn signal element 30.

The reflective element 22 is provided with an electrochromic power contact point 54 and an electrochromic common contact point 56 attached to the reverse face 66 and adapted to energize an electrochromic mirror dimming feature incorporated into the reflective element 22.

The power distributor 32 comprising the integrated heater pad/power supply array comprises a planar support member 33 having a reverse face 62 and an obverse face 64. An array 36 of electrically-conductive tracings is carried on the obverse face 64 and comprises a plurality of discrete contact points for electrical connection of the array 36 with selected functional elements associated with the reflective element assembly 21, such as the turn signal element or the electrochromic mirror dimming element. Electrical power is provided to the power distributor 32 through a power supply harness 26 suitably interconnected with the support member 33. The power supply harness 26 preferably carries a single positive electrical power lead for electrical communication with a positive power portion of the array 36, and a single common power lead or grounded lead for electrical communication with a common portion of the array 36 in order to provide required power to the circuits comprising the selected functional elements, such as the turn signal element, the electrochromic mirror dimming element, and the heater element described herein.

As indicated previously herein, the power distributor 32 is illustrated as configured to incorporate a heater pad. However, other embodiments can be configured wherein the power distributor 32 does not include a heater pad (such as, for example, where the mirror system is not to be provided with a heater pad), and the power distribution is accomplished with the incorporation of a different functionality, such as electrochromic dimming, or a power distributor incorporating a pair of electrical contact bars only. Preferably, the power distributor 32 is configured for power distribution over a relatively large area of the support member 33 so that the electrical contact points along the power distributor 32 for the different functionalities are located at those functionalities and are not concentrated in a relatively limited area of the support member 33. A heater pad provides an effective integration of such a distributed power supply and functionality.

Figure 4:
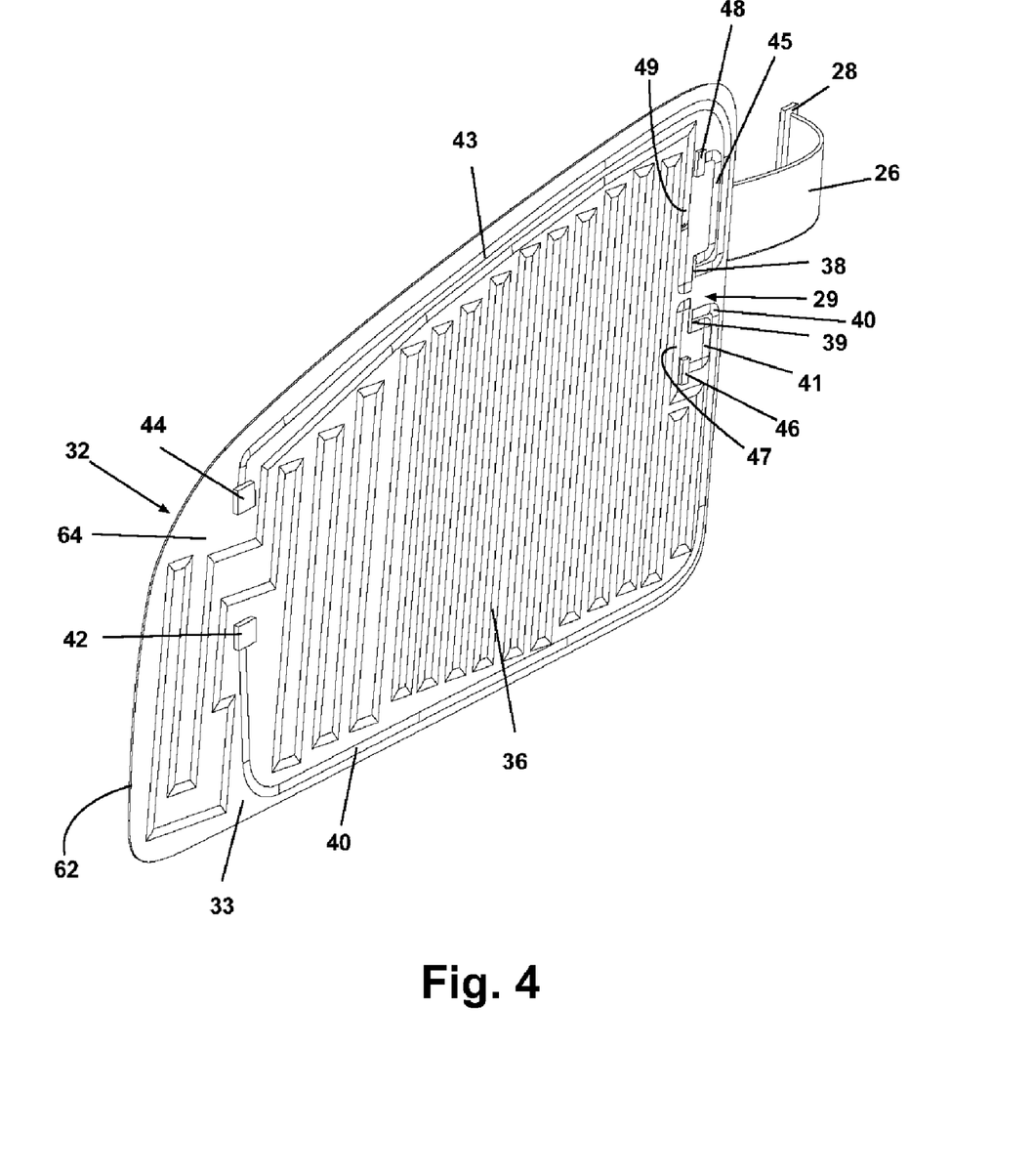
FIG. 4 is a close-up perspective view of the integrated heater pad/power supply array shown in FIG. 3.

As shown specifically in FIG. 4, the power distributor 32 comprises a power supply harness 26 extending from the reverse face 62 and operably connected in a generally well-known manner through the support member 33 to a module connection 29 on the obverse face 64. In addition to providing electrical power, the power supply harness 26 is adapted to provide operating control to the reflective element assembly 21. The power supply harness 26 terminates in a conventional plug connector 28 adapted for cooperative communication with the wire harness 24.

The module connection 29 is divided into a common lead 38 electrically connected to a turn signal common lead 43, an electrochromic common lead 45, and a heater common lead 49, and a power lead 39 electrically connected to a turn signal power lead 40, an electrochromic power lead 41, and a heater power lead 47. Electrically connected to the heater common lead 49 and the heater power lead 47 is a well-known heater tracing 36 incorporated into the obverse face 64 and adapted for defrosting and defogging the reflective element 22 when the integrated heater pad/power supply array 32 and the reflective element 22 are brought into operable communication.

The turn signal common lead 43 feeds a turn signal tracing 43 which terminates in a turn signal common contact 44, and an electrochromic common lead 45 terminates in an electrochromic common contact 48. Similarly, the turn signal power lead 40 feeds a turn signal power tracing 40 which terminates in a turn signal power contact 42. An electrochromic power lead 41 terminates in an electrochromic power contact 46.

The turn signal common contact 44 is adapted for electrical communication with the turn signal common contact point 52, and the turn signal power contact 42 is adapted for electrical communication with the turn signal power contact point 50. The electrochromic common contact 48 is adapted for electrical communication with the electrochromic common contact point 56, and the electrochromic power contact 46 is adapted for electrical communication with the electrochromic power contact point 54.

When the power distributor 32 is brought into aligned contact with the reflective element 22, the electrochromic common contact 48 will be brought into electrical communication with the electrochromic common contact point 56, and the electrochromic power contact 46 will be brought into electrical communication with the electrochromic power contact point 54, thereby providing power to the electrochromic mirror dimming element.

Similarly, the turn signal common contact 44 will be brought into electrical communication with the turn signal common contact point 52, and the turn signal power contact 42 will be brought into electrical communication with the turn signal power contact point 50, thereby providing electrical power to the turn signal element 30. Of course, the turn signal element 30 is brought into alignment with the optical region 30' on the reflective element during the mounting of these components to one another as well.

Figure 5:
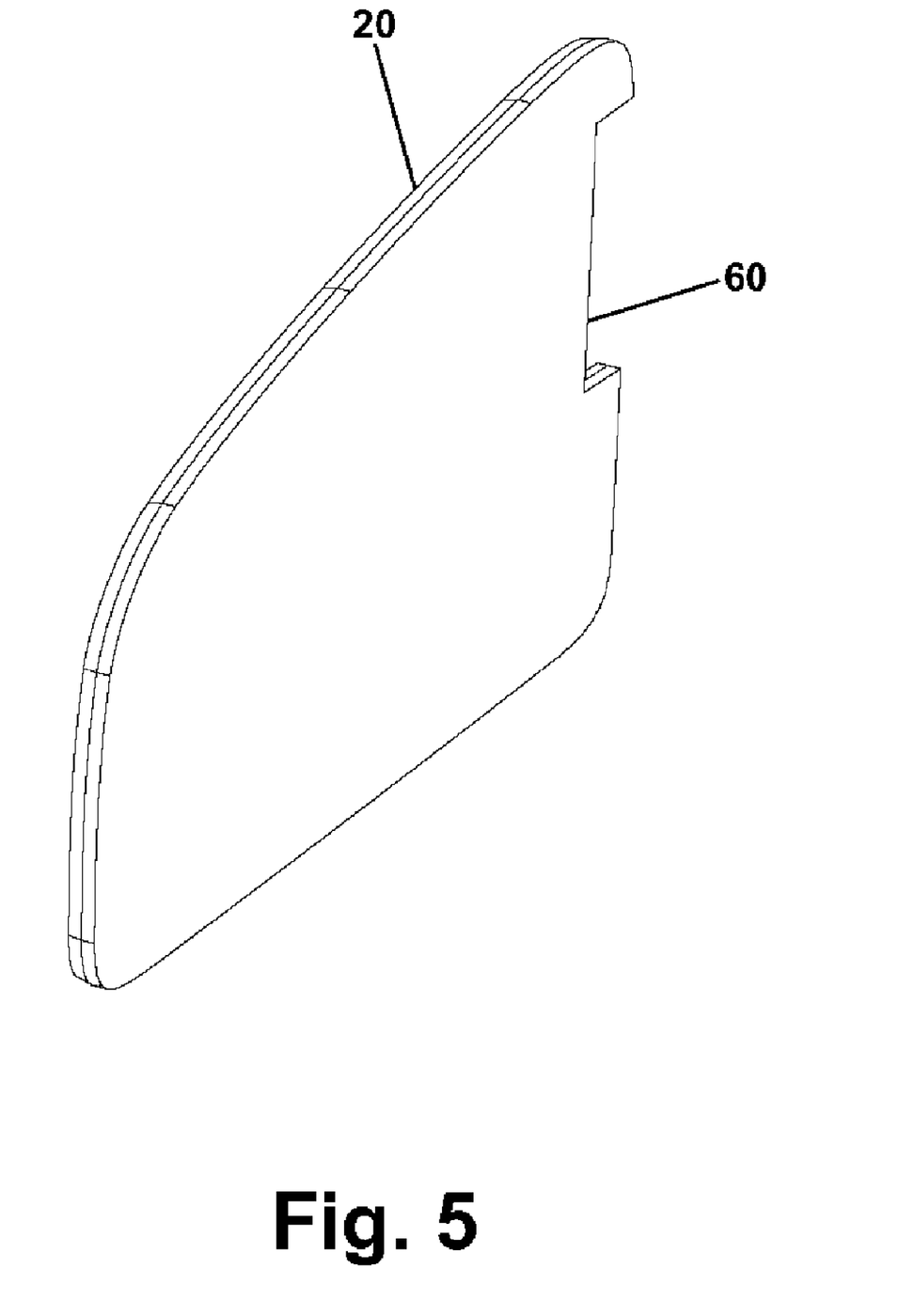
FIG. 5 is a perspective view of an alternate embodiment of the mirror case shown in FIG. 2.

The reflective element carrier 20 comprises a generally conventional reflective element carrier adapted to mount the reflective element assembly 21, provided with a power supply harness slot 58 aligned for mating cooperation with the power supply harness 26 so that, when the reflective element assembly 21 is mounted to the reflective element carrier 20, the power supply harness 26 can be inserted through the power supply harness slot 58 to be connected to the wire harness 24. As shown in FIG. 5, the reflective element carrier 20 can alternatively be provided with a power supply harness notch 60 rather than the power supply harness slot 58 to facilitate the connection of the power supply harness 26 through the reflective element carrier 20 to the wire harness 24.

Figure 6:
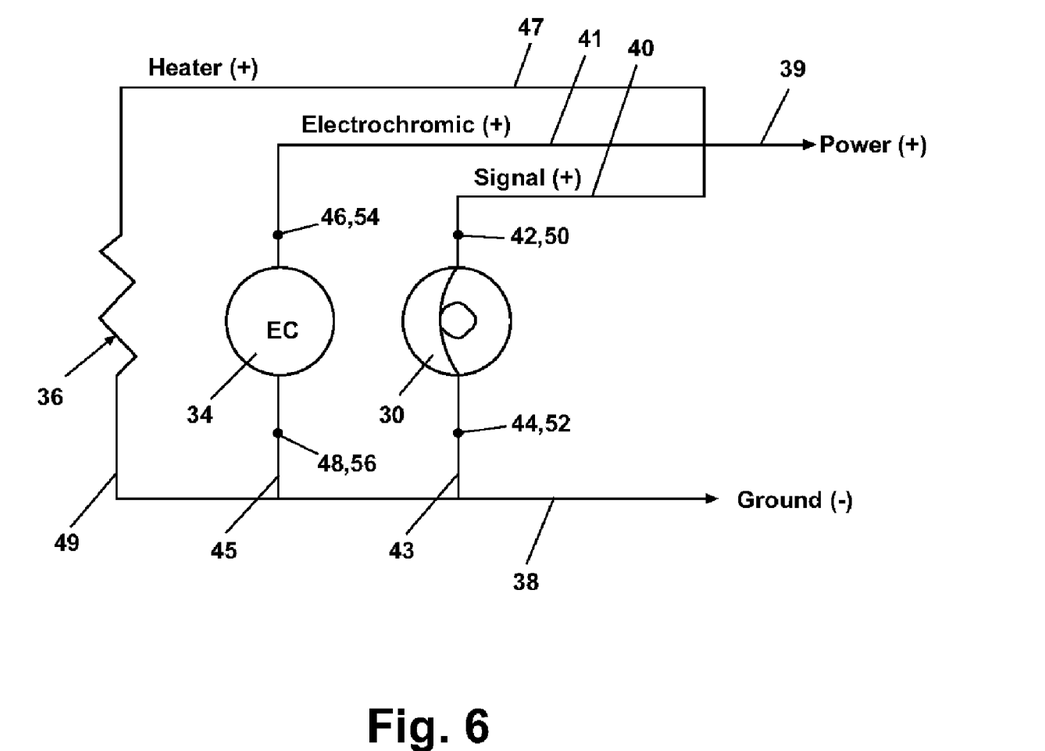
FIG. 6 is a schematic diagram of an electrical circuit for the rearview mirror system shown in FIG. 1.

FIG. 6 shows a schematic wiring diagram for the rearview mirror system 10 described herein. As shown in FIG. 6, the turn signal element 30, the electrochromic module 34, and the heater tracing 36 are each supplied by separate power leads 40, 41, 47 respectively, connected to a single power lead 39, and are all connected to a common or ground lead 38 through their respective common leads 43, 45, 49. The common and power contacts 42, 44, 46, 48, 50, 52, 54 and 56 are shown in FIG. 6 as well. As can be seen in FIG. 6, the mating sets of contact points that are brought into alignment during assembly of the vehicular mirror described herein are shown as matched pairs in FIG. 6: (42, 50) and (44, 52) for the turn signal element 30, and (46, 54) and (48, 56) for the electrochromic element 34. Since the heater element 36 has tracings which directly connect to the appropriate circuit components, no contact points are shown although contact points can be provided to the heater element 36 without departing from the scope of this invention.

The improved reflective element assembly described herein facilitates the assembly of the rearview mirror system by eliminating the multiple wire harnesses and plug-type connectors necessitated by the prior art assemblies to accommodate each functional element incorporated into the rearview mirror system. The heater pad, electrochromic dimming element, turn signal element, and other functional elements in the rearview mirror system can be readily integrated and interconnected with the primary wire harness to the rearview mirror system through a single plug connection which can be readily installed during assembly of the rearview mirror. The improved assembly will provide cost savings in reduced assembly time, and reduced misassembly of the complex prior art mirror system.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A reflective element assembly for an exterior rearview mirror system of a vehicle, said reflective element assembly associated with at least two functional elements each including at least one functional element electrical contact, and comprising:
   a reflective element having a reverse face and an obverse face, and a reflective element carrier;
   a power distributor disposed between said reflective element and said reflective element carrier, said power distributor including
   an integrated heater and power distribution element;
   a support member having a reverse face and an obverse face;
   an array of electrically-conductive tracings; and
   a plurality of discrete electrical contacts for electrical coupling of said array of electrically-conductive tracings with said at least two functional elements;
   at least one of said plurality of discrete electrical contacts adapted for electrical communication with at least one functional element electrical contact of a first functional element; and
   at least one of said plurality of discrete electrical contacts adapted for electrical communication with at least one functional element electrical contact of a second functional element;
   wherein said power distributor comprises a singular module connection.

2. A reflective element assembly in accordance with claim 1 wherein said first functional element comprises an indicator.

3. A reflective element assembly in accordance with claim 1 wherein said second functional element comprises an electrochromic reflective element.

4. A reflective element assembly in accordance with claim 1 wherein said array of electrically-conductive tracings is carried at said obverse face of said support member of said power distributor.

5. A reflective element assembly in accordance with claim 4 wherein, when said power distributor is disposed between said reflective element and said reflective element carrier, said obverse face of said support member of said power distributor is nearer said reverse face of said reflective element than is said reverse face of said support member.

6. A reflective element assembly in accordance with claim 1 wherein said power distributor comprises a power supply harness interconnected with said support member.

7. A reflective element assembly in accordance with claim 6 wherein said power supply harness carries a single ground lead for electrical communication with an electrically-conductive common portion of said array of electrically-conductive tracings.

8. A reflective element assembly in accordance with claim 6 wherein said power supply harness extends from said reverse face of said support member of said power distributor.

9. A reflective element assembly in accordance with claim 8 wherein said array of electrically-conductive tracings is carried at said obverse face of said support member of said power distributor.

10. A reflective element assembly in accordance with claim 9 wherein said power supply harness couples through said support element with said array of electrically-conductive tracings carried at said obverse face of said support member of said power distributor.

11. A reflective element assembly in accordance with claim 10 wherein said singular module connection is carried at said obverse face of said support member of said power distributor, and said power supply harness couples through said support element with said singular module connection.

12. A reflective element assembly in accordance with claim 10 wherein said power supply harness terminates in an electrical connector for cooperative communication with a vehicle wire harness.

13. A reflective element assembly in accordance with claim 12 wherein said power supply harness terminates in a plug connector.

14. A reflective element assembly in accordance with claim 1 wherein (a) a first portion of said array of electrically-conductive tracings and a first portion of said plurality of discrete electrical contacts comprise electrically-conductive common tracings that terminate in discrete electrical common contacts, and (b) a second portion of said array of electrically-conductive tracings and a second portion of said plurality of discrete electrical contacts comprise electrically-conductive power tracings that terminate in discrete electrical power contacts.

15. A reflective element assembly in accordance with claim 1 wherein (a) a first portion of said array of electrically-conductive tracings and a first portion of said plurality of discrete electrical contacts comprise an electrically-conductive common tracing terminating in a first electrical contact, and (b) a second portion of said array of electrically-conductive tracings and a second portion of said plurality of discrete electrical contacts comprise an electrically-conductive power tracing terminating in a second electrical contact that is separate and spaced away from said first electrical contact.

16. A reflective element assembly in accordance with claim 15 wherein (a) said first functional element comprises a turn signal indicator, said electrically-conductive common tracing comprises a turn signal indicator common tracing, and said electrically-conductive power tracing comprises a turn signal indicator power tracing, and (b) said second functional element comprises an electrochromic reflective element, said electrically-conductive common tracing comprises an electrochromic reflective element common tracing, and said electrically-conductive power tracing comprises an electrochromic reflective element power tracing.

17. A reflective element assembly in accordance with claim 11 wherein (a) said array of electrically-conductive tracings is carried at said obverse face of said support member of said power distributor, and (b) said power supply harness couples through said support element with said array of electrically-conductive tracings carried at said obverse face of said support member of said power distributor to said singular module connection at said obverse face of said support member of said power distributor, and (c) said singular module connection comprises an electrically-conductive common lead electrically coupled with tracings of said array, and (d) said singular module connection comprises an electrically-conductive power lead electrically coupled with tracings of said array.

18. A reflective element assembly in accordance with claim 14 wherein (a) said singular module connection is carried at said obverse face of said support member of said power distributor, and (b) said array of electrically-conductive tracings is carried at said obverse face of said support member of said power distributor, and (c) said power supply harness couples through said support element with said singular module connection at said obverse face of said support member of said power distributor, and (d) said singular module connection comprises an electrically-conductive common lead electrically coupled with tracings of said array, and (e) said array of electrically-conductive tracings comprises heater tracings, and (f) said singular module connection comprises an electrically-conductive power lead electrically coupled with said heater tracings.

19. A reflective element assembly in accordance with claim 1 wherein said array of electrically-conductive tracings comprises heater tracings, and said second functional element comprises an electrochromic reflective element.

20. A reflective element assembly for an exterior rearview mirror system of a vehicle, said reflective element assembly associated with at least two functional elements each including at least one functional element electrical contact, and comprising:
   a reflective element having a reverse face and an obverse face, and a reflective element carrier;
   a power distributor disposed between said reflective element and said reflective element carrier, said power distributor including
   an integrated heater and power distribution element;
   a support member having a reverse face and an obverse face;
   an array of electrically-conductive tracings; and
   a plurality of discrete electrical contacts for electrical coupling of said array of electrically-conductive tracings with said at least two functional elements;
   at least one of said plurality of discrete electrical contacts adapted for electrical communication with at least one functional element electrical contact of a first functional element; and
   at least one of said plurality of discrete electrical contacts adapted for electrical communication with at least one functional element electrical contact of a second functional element;
   wherein said power distributor comprises a power supply harness interconnected with said support member;
   wherein said array of electrically-conductive tracings is carried at said obverse face of said support member of said power distributor; and
   wherein said power supply harness couples through said support element with said array of electrically-conductive tracings carried at said obverse face of said support member of said power distributor.

21. A reflective element assembly in accordance with claim 20 wherein said first functional element comprises an indicator, said second functional element comprises an electrochromic reflective element, and said array of electrically-conductive tracings comprises heater tracings.

22. A reflective element assembly in accordance with claim 21 wherein said power supply harness couples through said support element with a singular module connection.

23. A reflective element assembly in accordance with claim 20 wherein (a) said array of electrically-conductive tracings and said plurality of discrete electrical contacts comprise an electrically-conductive common tracing that terminates in a first electrical contact, and (b) said array of electrically-conductive tracings and said plurality of discrete electrical contacts comprise an electrically-conductive power tracing that terminates in a second electrical contact that is separate and spaced away from said first electrical contact, and (c) one of (i) said first functional element comprises an indicator, and said common tracing comprises an indicator common tracing, and said power tracing comprises an indicator power tracing, and (ii) said second functional element comprises an electrochromic reflective element, and said common tracing comprises an electrochromic reflective element common tracing, and said power tracing comprises an electrochromic reflective element power tracing.

24. A reflective element assembly in accordance with claim 20 wherein (a) said array of electrically-conductive tracings is carried at said obverse face of said support member of said power distributor, and (b) said power supply harness couples through said support element with said array of electrically-conductive tracings carried at said obverse face of said support member of said power distributor to a singular module connection at said obverse face of said support member of said power distributor, and (c) said singular module connection comprises an electrically-conductive common lead electrically coupled with tracings of said array and wherein said singular module connection comprises an electrically-conductive power lead electrically coupled with tracings of said array.

25. A reflective element assembly in accordance with claim 20 wherein (a) a singular module connection is carried at said obverse face of said support member of said power distributor, and (b) said array of electrically-conductive tracings is carried at said obverse face of said support member of said power distributor, and (c) said power supply harness couples through said support element with said singular module connection at said obverse face of said support member of said power distributor, and (d) said singular module connection comprises an electrically-conductive common lead electrically coupled with tracings of said array, and (e) said array of electrically-conductive tracings comprises heater tracings, and (f) said singular module connection comprises an electrically-conductive power lead electrically coupled with said heater tracings.

26. A reflective element assembly for an exterior rearview mirror system of a vehicle, said reflective element assembly associated with at least two functional elements each including at least one functional element electrical contact, and comprising:
   an electrochromic reflective element having a reverse face and an obverse face, and a reflective element carrier;
   a power distributor disposed between said electrochromic reflective element and said reflective element carrier, said power distributor including
   an integrated heater and power distribution element;
   a support member having a reverse face and an obverse face;
   an array of electrically-conductive tracings; and
   a plurality of discrete electrical contacts for electrical coupling of said array of electrically-conductive tracings with said at least two functional elements;
   wherein said array of electrically-conductive tracings comprises heater tracings;

at least one of said plurality of discrete electrical contacts adapted for electrical communication with at least one functional element electrical contact of a first functional element;

at least one of said plurality of discrete electrical contacts adapted for electrical communication with at least one functional element electrical contact of a second functional element, said second functional element comprising said electrochromic reflective element;

wherein at least one of (a) said power distributor comprises a power supply harness interconnected with said support member, (b) said array of electrically-conductive tracings is carried at said obverse face of said support member of said power distributor, (c) said array of electrically-conductive tracings is carried at said obverse face of said support member of said power distributor and a power supply harness couples through said support element with said array of electrically-conductive tracings carried at said obverse face of said support member of said power distributor, (d) said array of electrically-conductive tracings is carried at said obverse face of said support member of said power distributor and coupling is made through said support element with said array of electrically-conductive tracings carried at said obverse face of said support member of said power distributor, and (e) said array of electrically-conductive tracings is carried at said obverse face of said support member of said power distributor and coupling is made through said support element with said array of electrically-conductive tracings carried at said obverse face of said support member of said power distributor to a singular module connection.

* * * * *

UNITED STATES PATENT AND TRADEMARK OFFICE
CERTIFICATE OF CORRECTION

| | | |
|---|---|---|
| PATENT NO. | : 8,173,936 B2 | |
| APPLICATION NO. | : 12/979955 | |
| DATED | : May 8, 2012 | |
| INVENTOR(S) | : Don S. Rawlings | |

It is certified that error appears in the above-identified patent and that said Letters Patent is hereby corrected as shown below:

In the Summary of the Invention:

Column 1, lines 55-67, and Column 2, lines 1-3, read: "[0005] A reflective element assembly for a vehicle exterior rearview mirror system comprises a reflective element having a reverse face and an obverse face, and a reflective element carrier. A power distributor disposed between the reflective element and reflective element carrier includes an integrated heater/power supply, a support member having a reverse face and an obverse face, an array of electrically-conductive tracings, and a plurality of discrete contact points for electrical coupling of the array with at least two functional elements. At least one of the plurality of discrete contact points is adapted for electrical communication with at least one functional contact point of a first functional element. At least one of the plurality of discrete contact points is adapted for electrical communication with at least one functional contact point of a second functional element. The power distributor comprises a singular module connection."

It should read:
"[0005] A reflective element assembly is associated with at least two functional elements, each functional element including at least one functional element electrical contact. The reflective element assembly has a reflective element and reflective element carrier. A power distributor is disposed between the reflective element and the carrier, and includes an integrated heater and power distribution element, a support member having a reverse face and an obverse face, an array of electrically-conductive tracings, and a plurality of discrete electrical contacts points for electrical coupling of the array with the at least two functional elements. At least one of the plurality of discrete electrical contacts points is adapted for electrical communication with at least one functional element electrical contact point of a first functional element, and at least one functional element electrical contact point of a second functional element. The power distributor has a singular module connection."

Signed and Sealed this
Twenty-sixth Day of June, 2012

David J. Kappos
*Director of the United States Patent and Trademark Office*